Jan 6, 1931.  T. McL. JASPER  1,787,580
METHOD OF ELECTRICALLY WELDING TUBULAR
CONNECTIONS FOR THICK WALLED VESSELS
Filed April 19, 1929
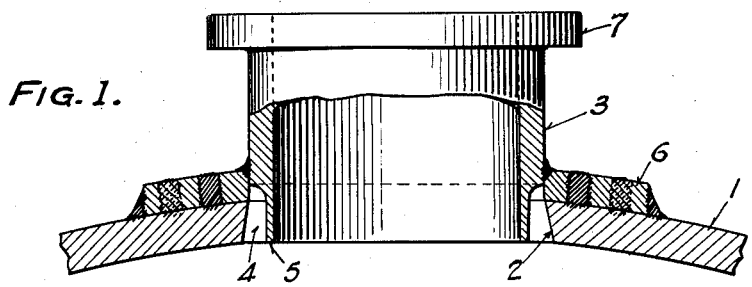
FIG. 1.
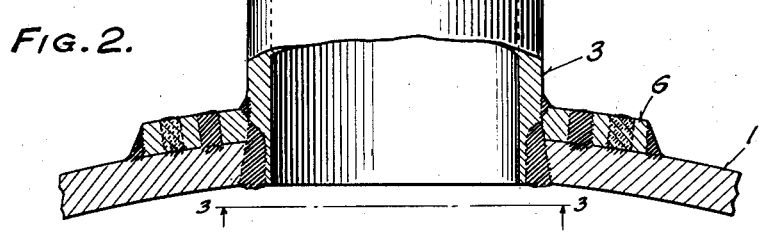
FIG. 2.
FIG. 3.
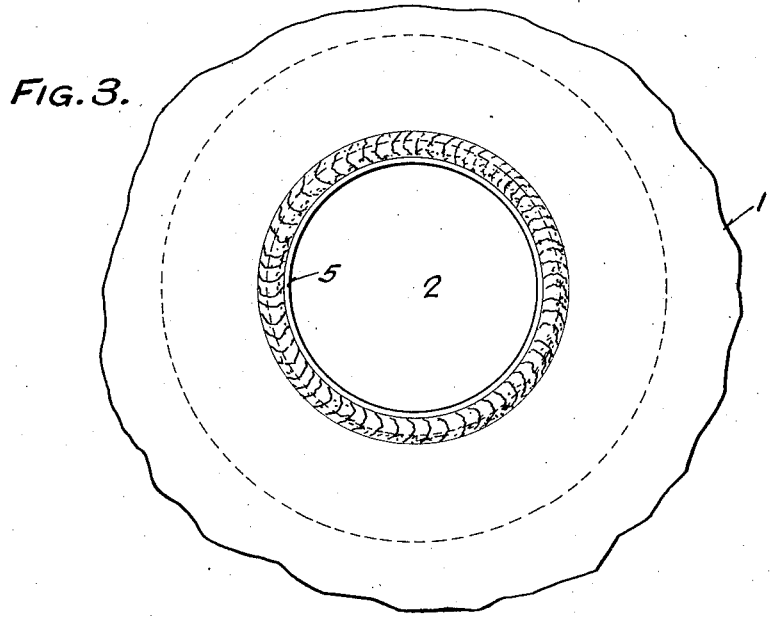
FIG. 4.
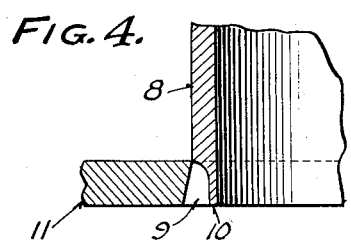
INVENTOR.
T. McLean Jasper
BY
ATTORNEY.

Patented Jan. 6, 1931

1,787,580

UNITED STATES PATENT OFFICE

THOMAS McLEAN JASPER, OF MILWAUKEE, WISCONSIN, ASSIGNOR TO A. O. SMITH CORPORATION, OF MILWAUKEE, WISCONSIN, A CORPORATION OF NEW YORK

METHOD OF ELECTRICALLY WELDING TUBULAR CONNECTIONS FOR THICK-WALLED VESSELS

Application filed April 19, 1929. Serial No. 356,421.

This invention relates to electrically welding tubular connections for thick-walled pressure vessels.

The invention is particularly applicable to the welding of thick tubular connections to thick-walled pressure vessels such as those disclosed in Reissue Patent No. 16,865 to L. R. Smith, although the invention may be employed for various purposes including the flanging of thick metal tubes.

The object of the invention is to provide a method of electrically welding a thick tubular connection to a flat or curved metal plate and to sufficiently relieve the tension stresses set up in the weld to prevent any undue tendency of the plate metal to crack.

An embodiment of the invention is illustrated in the accompanying drawings in which the views are as follows:

Figure 1 is a longitudinal section through a manway and the adjacent portion of the vessel showing the parts prepared for the welding operation.

Fig. 2 is a similar view showing the parts welded together.

Fig. 3 is a view of the finished weld on line 3—3 of Fig. 2.

Fig. 4 is a detail longitudinal section showing a modified application of the invention.

The thick metal wall 1 of the vessel has a circular opening 2 for receiving the tubular connection 3. The edges of the opening are preferably cut to converge slightly towards the outside of the vessel. The tubular connection 3 has its inner end chamfered to provide a welding groove 4 between the same and the circular edges of the opening. The chamfering of the connection provides a thin flexible lip 5 which forms an inner wall for the welding groove.

A reenforcing plate 6 encircles the connection and is welded to the vessel wall in any suitable manner. The welding groove 4 is preferably of greater depth than the thickness of the vessel wall so that the bottom of the groove is closed by the reenforcing plate 6.

Welding metal is then fused in the groove by means of an electric arc to weld the tubular connection, reenforcing plate, and vessel wall into an integral structure. The welding metal upon cooling tends to contract and, if not allowed to do so, excessive tension stresses would be set up therein which would tend to crack the metal of the vessel wall adjacent the weld.

The present invention overcomes this difficulty by providing the thin flexible side wall 5 for the groove which flexes outwardly upon contraction of the welding metal to compensate for said contraction and thereby relieve the objectionable tension stresses therein. The inside diameter of the connection at the welded end is made greater than the normal diameter thereof.

A further advantage is obtained from the form of the welding groove since the narrowness of the groove limits the width of contracting welding metal and thereby reduces the amount of possible tension stresses to be relieved.

The tubular connection may have a flange 7 welded to the outer end thereof in any suitable manner.

In Fig. 4 the invention is shown as applied to the flanging of a thick metal tube 8. The tube is chamfered at its end to thin the same and provide a welding groove 9 between the thinned portion 10 of the tube and the flange 11 which is to be welded thereto. Welding material is deposited in the groove and, as the same cools and contracts, it draws the thinned portion 10 of the tube outwardly thus relieving the tension stresses of the weld.

The invention may have various embodiments within the scope of the claims.

I claim:

1. The method of welding the end of a thick metal tube to a thick metal plate, which comprises chamfering the end of the tube to provide a thin flexible lip at the inner circumference thereof, inserting the chamfered end of said tube into an opening in the thick metal plate with the lip cooperating with the edges of the opening to form a welding groove, and filling said groove with fusing welding metal by means of an electric arc to weld said thick metal tube to said plate, the lip flexing outwardly to compensate for the contraction of the welding metal and to thereby relieve objectionable tension stresses which may otherwise have been set up in the welding metal.

2. The method of welding thick tubular connections to thick-walled pressure vessels, which comprises chamfering the inner end of the tubular connection to provide a thin flexible lip at the inner circumference thereof, inserting the chamfered end of said connection in an opening in the thick vessel wall, welding a reenforcing plate to the vessel wall around said opening, said thin lip reenforcing plate and the edges of the opening in the vessel wall forming a welding groove, filling said welding groove with fusing welding metal to weld said tubular connection, reenforcing plate, and vessel wall into an integral structure, said thin lip on the tubular connection flexing outwardly as the welding metal contracts upon cooling to relieve objectionable tension stresses which may otherwise have been set up in the welding metal.

3. The method of welding thick tubular connections to thick walled pressure vessels which comprises providing a thin flexible lip at one end of the tubular connection, said lip being integral with said connection and continuous circumferentially therewith, providing an opening in the thick walled pressure vessel of a diameter substantially greater than the outside diameter of said lip, inserting said lip into the opening so provided and spacing the same concentrically with the walls of the opening, the end of the thick tubular connection forming the bottom of a welding groove between said lip and the wall of the opening in the vessel wall, and filling said welding groove with fusing welding metal by means of an electric arc to weld said thick tubular connection to said thick walled pressure vessel, and allowing said thin flexible lip to expand outwardly to compensate for the contraction of the welding metal in said welding groove and to thereby relieve objectionable tension stresses which would otherwise be set up in the welding metal.

In witness whereof I have signed my name at Milwaukee, Wisconsin, this 16th day of April, 1929.

T. McLEAN JASPER.